(12) United States Patent
Anwar (10) Patent No.: US 7,009,624 B2
(45) Date of Patent: Mar. 7, 2006

(54) SHAPE PROCESSOR

(75) Inventor: Majid Anwar, Glasgow (GB)

(73) Assignee: Picsel Research Limited, Glasgow (GB)

( * ) Notice: Subject to any disclaimer, the term of this patent is extended or adjusted under 35 U.S.C. 154(b) by 0 days.

(21) Appl. No.: 10/853,482

(22) Filed: May 24, 2004

(65) Prior Publication Data

US 2005/0030321 A1 Feb. 10, 2005

Related U.S. Application Data (63) Continuation of application No. 09/835,462, filed on Apr. 16, 2001, now Pat. No. 6,781,600.

(30) Foreign Application Priority Data

Apr. 14, 2000 (GB) .................................... 0001929

(51) Int. Cl.
G09G 5/00 (2006.01)
(52) U.S. Cl. ...................... 345/611; 345/629; 345/592; 345/589; 345/620; 345/626
(58) Field of Classification Search ................ 345/629, 345/592, 589, 620, 626, 611
See application file for complete search history.

(56) References Cited

U.S. PATENT DOCUMENTS

| | | |
|---|---|---|
| 5,083,262 A | 1/1992 | Haff |
| 5,278,678 A | 1/1994 | Harrington |
| 5,390,320 A | 2/1995 | Smithline |
| 5,528,738 A | 6/1996 | Sfarti et al. |
| 5,754,348 A | 5/1998 | Soohoo |
| 5,867,166 A | 2/1999 | Schick et al. |
| 5,872,902 A | 2/1999 | Kuchkuda et al. |
| 5,910,805 A | 6/1999 | Haschart et al. |
| 5,911,066 A | 6/1999 | Atkinson et al. |
| 5,920,323 A * | 7/1999 | Fukuzawa .................... 345/441 |
| 6,008,820 A | 12/1999 | Chauvin et al. |
| 6,025,853 A | 2/2000 | Baldwin |
| 6,034,700 A | 3/2000 | Nickell et al. |
| 6,049,390 A | 4/2000 | Notredame et al. |
| 6,125,391 A | 9/2000 | Meltzer et al. |
| 6,336,124 B1 | 1/2002 | Alam et al. |
| 6,480,201 B1 | 11/2002 | Fushiki et al. |
| 6,560,361 B1 | 5/2003 | Collins |
| 6,570,579 B1 | 5/2003 | MacInnis et al. |

FOREIGN PATENT DOCUMENTS

| | | |
|---|---|---|
| EP | 0 438 194 A | 7/1991 |
| EP | 0 465 250 | 1/1992 |
| EP | 0 479 496 A | 4/1992 |

(Continued)

OTHER PUBLICATIONS

Foley, et al., "Computer Graphics, Principles and Practice," Addison Wesley, pp. 91-104, 132-140, 924-930, 945-986, 1145 (1997).

(Continued)

Primary Examiner—Matthew C. Bella
Assistant Examiner—Mike Rahmjoo
(74) Attorney, Agent, or Firm—Fish & Neave IP Group Ropes & Gray LLP (57) ABSTRACT

The shape processor is a rendering module that may be used to stream graphical objects having a predefined format into a frame buffer or a physical display. Documents to be rendered by the shape processor may be decomposed into primitive graphical objects and passed to the shape processor, which may in turn compose the objects for display. Composed objects are then blended into current video data on an object by object basis.

24 Claims, 5 Drawing Sheets

FOREIGN PATENT DOCUMENTS

| | | |
|---|---|---|
| EP | 0 513 584 A | 11/1992 |
| EP | 529 121 A | 3/1993 |
| EP | 0 753 832 A | 1/1997 |
| EP | 0 764 918 A | 3/1997 |
| EP | 0 860 769 A | 8/1998 |
| EP | 0 949 571 A2 | 10/1999 |
| GB | 2 313 277 A | 11/1997 |
| WO | WO 98/10356 | 3/1998 |
| WO | WO 98 37506 | 8/1998 |
| WO | WO 97/34240 | 9/1998 |
| WO | WO 99/10840 | 3/1999 |
| WO | WO 00/10372 | 3/2000 |

OTHER PUBLICATIONS

Smith, A.R., "Tint Fill," Proc. Siggraph (ACM) 1979: 276-283 (1979).

Blumberg, et al. Visual Realism and Interactivity for the Internet. Proceedings of IEEE Compcon, 1997, San Jose, Feb. 23-26, 1997, Los Alamitos, IEEE Comp. Soc. Press. pp. 269-273 (Feb. 1997).

Rowe, J.H. Metafiles and Computer Graphics. Computers and Graphics. Pergamon Press, Ltd. Oxford, Great Britain. 10:2 (103-6) (1986).

* cited by examiner

SHAPE PROCESSOR

RELATED APPLICATIONS

This application is a continuation of U.S. patent Ser. No. 09/835,462, filed Apr. 16, 2001, now U.S. Pat. No. 6,781,600 which claims priority to the earlier filed British Patent Application No. 0009129.8, filed 14 Apr. 2000, and having Majid Anwar as an inventor, the contents of which are hereby incorporated by reference.

BACKGROUND OF THE INVENTION

Graphical rendering of abstract shapes may require substantial processing of shape description data. Known methods for processing shapes may be found, for example, in the Java 2D API, which provides software tools for processing two dimensional vector graphics. However, there remains a need for a shape processing engine that reduces computational complexity to conserve processing resources, particularly in embedded systems that include display devices.

SUMMARY OF THE INVENTION

The shape processor is a rendering module that may be used to stream graphical objects having a predefined format into a frame buffer or a physical display. Documents to be rendered by the shape processor may be decomposed into primitive graphical objects and passed to the shape processor, which may in turn compose the objects for display. The shape processor advantageously processes each object as grayscale values until pixel data for the object is output to a display or frame buffer.

A system for processing graphical objects may include an input mechanism for receiving a stream of objects, each object having a set of parameters that define an image; and an object processor that processes the stream of objects on an object by object basis to create a pixel array.

One of the set of parameters may be a path, the object processor processing the path to create a pixel array representative of an outline of the image. The object processor may anti-alias the edges of the path. The object processor may run-length encode the outline of the image. One of the set of parameters may be a bounding box, the bounding box indicating to the object processor an area into which the object is to be rendered. The object processor may receive a smoothness factor, the smoothness factor specifying an amount of over-sampling of the object relative to the pixel array. One of the set of parameters may be a transparency, the transparency including a transparency value or a pointer to a bitmap of transparency values for the shape.

One of the set of parameters may be a fill, the fill including at least one of a color, a texture, or a bitmap. The anti-aliased edges may be represented as grayscale values. A tone response curve may be applied to the grayscale values of the anti-aliased edges. The pixel array may be transmitted to at least one of a screen, a printer, a network port, or a file. One of the parameters may be pre-processed shape data. The pre-processed shape data may include a clip mask. The pre-processed shape data may include a transparency. The pre-processed shape data may include a fill. The method may further include storing intermediate processing data in a cache, the intermediate processing data including at least one of a clip mask, a fill, or a transparency.

A method for image rendering described herein may include receiving an object to be displayed, the object including a shape and a fill; converting the shape of the object into a plurality of lines of encoded scan data having one of at least two possible states for pixels of a display including a first state and a second state, the first state representing a pixel inside the shape and the second state representing a pixel outside the shape; and blending each of the plurality of lines of encoded scan data and the fill into a line of a frame for the display.

The encoded scan data may include a third possible state for a pixel of a display representing a portion of a pixel inside the shape. The shape may include a path including a plurality of segments. The method may include converting one or more of the plurality of segments of the path that may be curved into a plurality of non-curved segments. The frame may include at least one of a video memory or a display device. The frame may correspond to at least one of a non-video memory or an output bitmap format buffer. The shape may include a clip mask of encoded scan data. A value for the third possible state may be calculated for a pixel by dividing the pixel into a plurality of sub-pixel regions, determining which ones of the plurality of sub-pixel regions are inside the shape, and determining a ratio of the ones of the plurality of sub-pixel regions inside the shape to the plurality of sub-pixel regions. The value may be represented as a grayscale value.

The object to be displayed may include a transparency and blending may further include blending each of the plurality of lines of encoded scan data and the transparency into a line of a frame for the display. The object to be displayed may include a transparency, the transparency being pre-processed according to at least one of a bit-depth correction, a tone correction, a scaling, a decompression, or a decoding. The transparency may include a pointer to a bitmap of transparency values for the shape. The fill may include at least one of a color, a texture, or a bitmap. The method may include storing the plurality of lines of encoded scan data as a clip mask in a cache. The method may include indexing the clip mask according to the shape.

A method for achromatically anti-aliasing the edges of a rendered color image as described herein may include receiving an object to be displayed, the object including a shape and a fill, the fill including one or more colors; representing a pixel of a display as a sub-pixel matrix, the sub-pixel matrix including one or more sub-pixel regions covering the pixel; intersecting the shape with the sub-pixel matrix; and converting the sub-pixel matrix to a grayscale value for the pixel.

The method may include blending the grayscale value for the pixel and the fill corresponding to the pixel with a previous value for the pixel. The method may include repeating receiving an object, representing a pixel, intersecting the shape, converting the sub-pixel matrix, and blending for a scan line of pixels. The method may include run-length encoding the grayscale values for the scan line of pixels. One or more dimensions of the sub-pixel matrix may be controlled by a smoothness value.

A method for smoothing an edge of a graphical object as described herein may include receiving an object to be displayed, the object including a path that outlines the object, the path having an inside and an outside; for each one of a plurality of pixels that intersect the path, over-sampling the one of the pixels to obtain a grayscale value representative of a portion of the one of the pixels that may be inside the path; and blending the plurality of pixels with data stored in a pixel array.

The method may include, for each one of the plurality of pixels, weighting a fill value for the pixel according to the grayscale value and de-weighting the data stored in the video memory according to the grayscale value. The method may include, for each one of the plurality of pixels, weighting a fill value for the pixel according to a transparency value and de-weighting the data stored in the pixel array according to the transparency value.

A system for processing graphical objects as described herein may include receiving means for receiving an object to be displayed, the object including a shape, a fill, and an alpha; converting means for converting the shape of the object into encoded scan data having one of at least two possible states for pixels including a first state and a second state, the first state representing a pixel inside the shape and the second state representing a pixel outside the shape; and blending means for blending the encoded scan data, the fill, and the alpha, into a line of a frame.

The encoded scan data may have a third possible state, the third possible state including a grayscale value representing a pixel that may be on an edge of the shape, the grayscale value corresponding to a portion of the pixel that may be inside the shape. The frame may correspond to at least one of a display, a printer, a file, or a network port. The object may include at least one of a background fill or a replacement fill, the blending means blending the at least one of the background fill or the replacement fill into a line of a frame.

A computer program for processing graphical objects as described herein may include computer executable code to receive an object to be displayed, the object including a shape, a fill, and an alpha; computer executable code to convert the shape of the object into encoded scan data having one of at least two possible states for pixels of a pixel array including a first state and a second state, the first state representing a pixel inside the shape and the second state representing a pixel outside the shape; and computer executable code to blend the encoded scan data, the fill, and the alpha, into a line of a frame of the pixel array.

The pixel array may correspond to at least one of a display, a printer, a file, or a network port. The encoded scan data may have a third possible state, the third possible state including a grayscale value representing a pixel that may be on an edge of the shape, the grayscale value corresponding to a portion of the pixel that may be inside the shape.

A system for processing graphical objects as described herein may include a processor, the processor configured to receive a graphical object that may include a shape, a fill, and a transparency, to convert the shape of the graphical object into encoded scan data that corresponds to inside pixels, outside pixels, and transition pixels for a scan line of a display, each transition pixel including a grayscale value corresponding to a portion of the pixel within the shape, and to combine the encoded scan data, the fill, and the alpha with a line of pixel data; and a memory that stores the line of pixel data, the memory adapted to provide the line of pixel data to the processor, and the memory adapted to store a new line of pixel data that may be generated when the line of pixel data may be combined with the encoded scan data, the fill, and the transparency.

The system may include a display configured to display the memory. The processor may be one or more of a microprocessor, a microcontroller, an embedded microcontroller, a programmable digital signal processor, an application specific integrated circuit, a programmable gate array, or programmable array logic. The system may be at least one of a printer configured to print the lines of pixel data stored in the memory, a storage device configured to store the lines of pixel data stored in the memory, a network device configured to output the lines of pixel data stored in the memory. The processor may be at least one of a chip, a chipset, or a die. The processor and the memory may be at least one of a chip, a chipset, or a die. The display may be a display of at least one of an electronic organizer, a palm-top computer, a hand-held gaming device, a web-enabled cellular phone, a personal digital assistant, an enhanced telephone, a thin network client, or a set-top box.

The display may be at least one of a printer or a plotter. The display may be used in a document management system. The display may be used in at least one of a facsimile machine, a photocopier, or a printer of a document management system. The display may be used in an in-car system. The display may be used in at least one of an audio player, a microwave, a refrigerator, a washing machine, a clothing dryer, an oven, or a dishwasher. The processor may receive a plurality of graphical objects and processes the plurality of graphical objects in parallel.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, including a two-dimensional shape processor that employs spatial filtering and tone control for the edges of rendered objects. However, it will be understood by those of ordinary skill in the art that the methods and systems described herein may be suitably adapted to other applications, such as three-dimensional shape processing, and may be combined with full image anti-aliasing. For example, a crude full image anti-aliasing step may be combined with fine anti-aliasing of object edges. All such adaptations and modifications that would be clear to one of ordinary skill in the art are intended to fall within the scope of the invention described herein.

Figure 1:
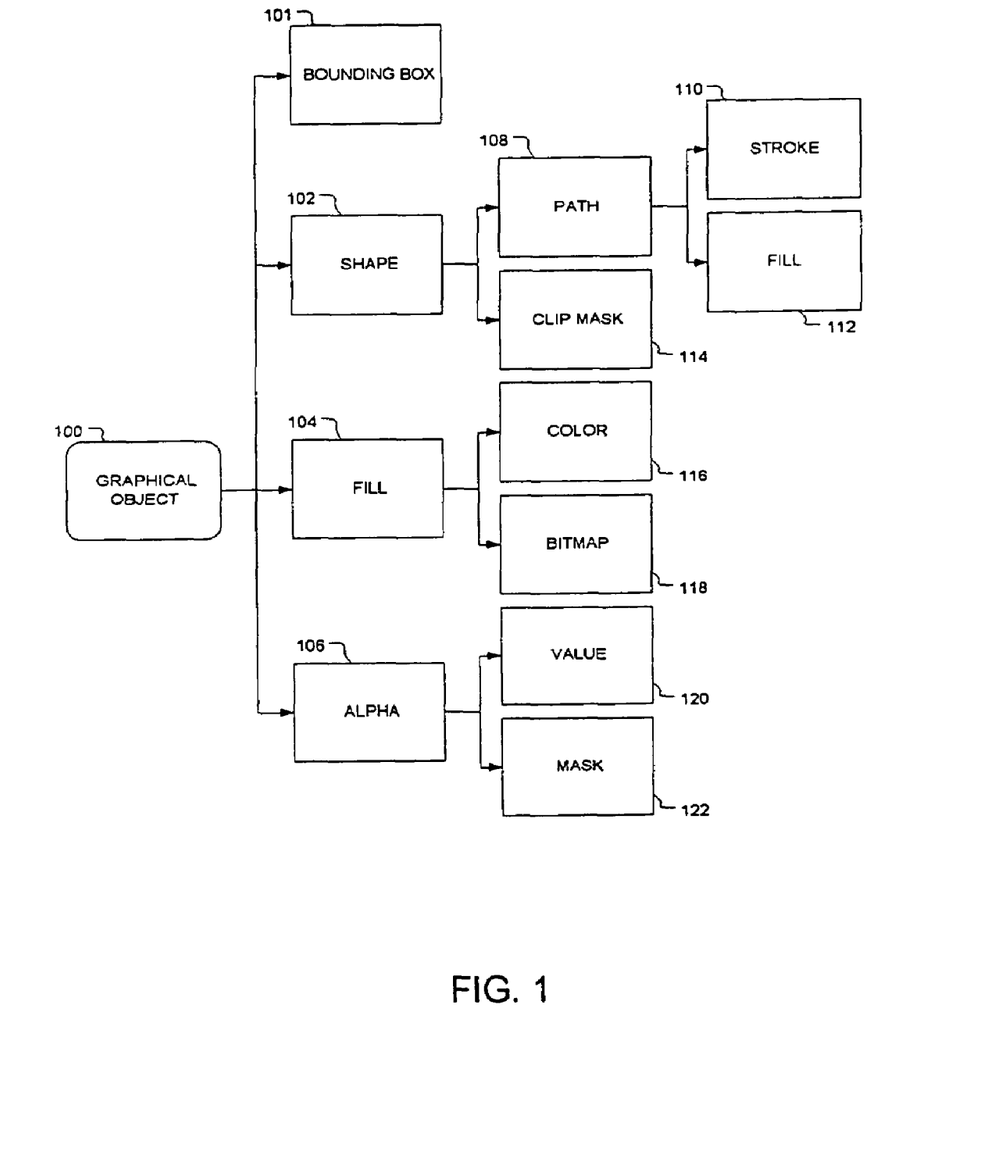
FIG. 1 shows a data structure for a graphical object that may be used with a shape processor.

FIG. 1 shows a data structure for a graphical object that may be used with a shape processor. The graphical object 100, or simply object 100, may include a bounding box 101, a shape 102, a fill 104, and an alpha 106. The shape 102 may include a path 108 with stroke 110 and fill 112 parameters, or a clip mask 114. The fill 104 may include a color 116 or a bitmap 118. The alpha 106 may include a value 120 or a mask 122.

The bounding box 101 may include a location where the object 100 is to be rendered, and may define a region into which the object is to be drawn. This parameter may be used, for example, to simplify rendering of an arc by combining a circular path with a bounding box 101 that overlays one quadrant of the circle.

The shape 102 may include a path 108 that defines a sequence of path elements connected using a PostScript-style path description. Other path representations are known and may also be used. The path 108 may include, for example, straight line segments, Bezier curves with a direction and a curvature controlled by two points, or other path constructs. The path 108 may be open or closed. In order to support more complex geometries, the path 108 may include self-intersecting or multiple disjoint regions. The stroke 110 for the path 108 may include parameters or attributes, including, for example, join attributes that specify rendering for joined path elements, such as round, beveled, or mitered, and cap attributes that specify rendering for an end of the path 108, such as round, butt, square, triangular, and so forth. The fill 112 may include a winding rule or other algorithm or parameter for distinguishing an inside of the path 108 from an outside of the path 108, so that suitable regions may be filled. The clip mask 114 may include a pointer to a cached rendering of the graphical object 100, in order to reduce redundant processing of recurring objects.

The fill 104 may generally include information concerning how a shape 102 is to be filled. This may include, for example, a color 116, which may be a color value defined on a palette, such as an 8-bit palette, or may be a component based color such as 24-bit RGB, 15-bit RGB, or 32-bit CMYK, or the color 116 may be a gray scale value. The fill 104 may include a bitmap 118 that includes a bitmap of a texture to be used for filling the shape 102. The bitmap 118 may instead include a pointer to a bitmap to be used for filling the shape 102. Such a bitmap may be provided in any variety of color model, such as those used for the fill 104.

The alpha 106 may generally include information relating to a transparency of the shape 102 when filled and displayed. The alpha may include a value 120 that is a single value describing transparency for an entire shape 102, typically ranging from zero (transparent) to one (opaque). Optionally, the alpha 106 may include a mask 122 that is an alpha mask, or pointer to an alpha mask, of values for each pixel of the rendered shape 102.

Suitable adaptations of, and enhancements to, the above data structures will be clear to one of skill in the art. In particular, the graphical object 100 may include other features described in rendering specifications such as PostScript, the Java 2D API, or the Quartz and QuickDraw libraries used, for example, in the Mac OS X operating system.

Figure 2:
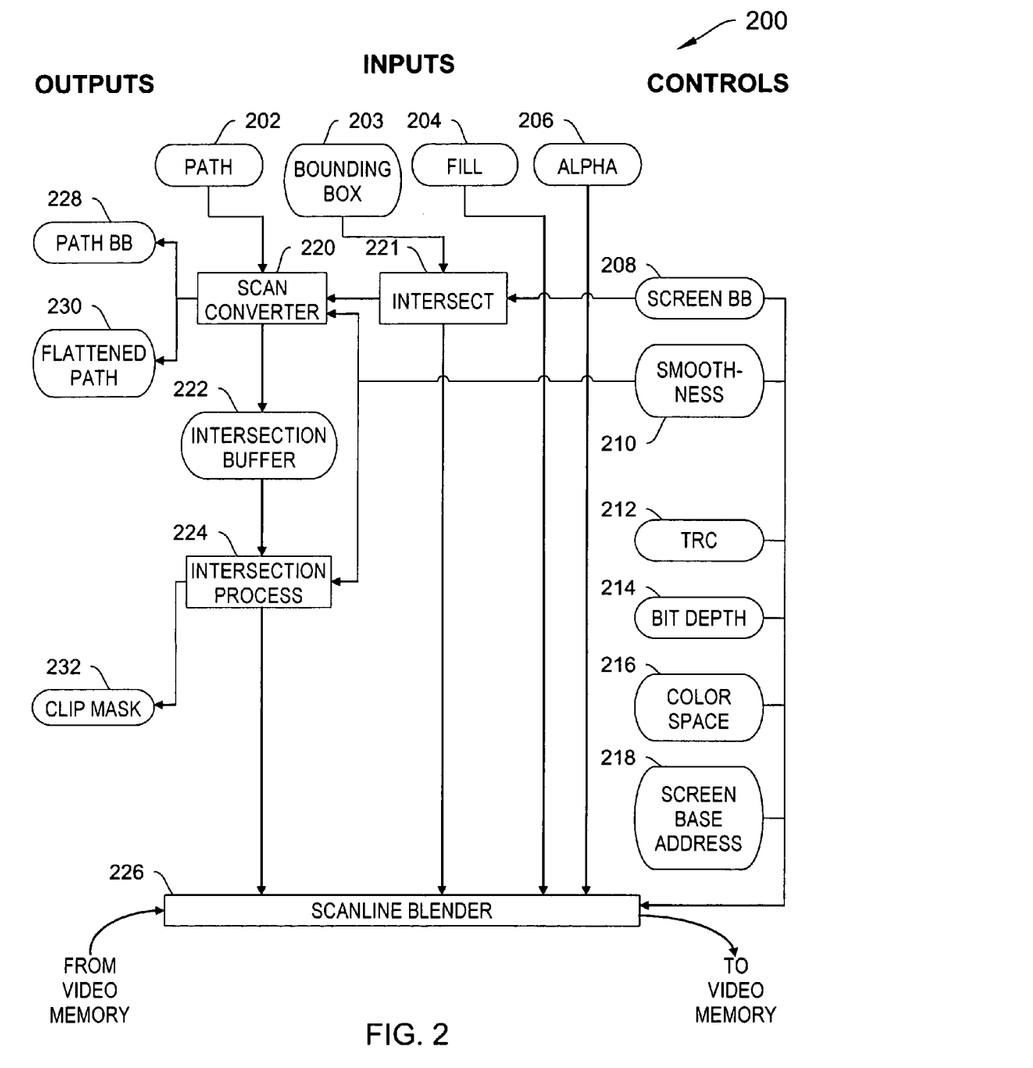
FIG. 2 is a functional block diagram of a shape processor.

FIG. 2 is a functional block diagram of a shape processor. Generally, the shape processor 200 provides an input mechanism for receiving a stream of graphical objects, and includes an object processor that processes the stream of objects on an object by object basis to create a pixel array for display on a screen. The shape processor 200 receives a graphical object described by a shape, shown in FIG. 2 as path 202, a bounding box 203, a fill 204, and an alpha 206, which may correspond, for example, to the components of the graphical object 100 described above in reference to FIG. 1. The shape processor 200 may receive a clip mask 232 instead of a path 202, which may be passed by the shape processor 200 directly to a scan line blender 226, as will be described below.

Control data for the shape processor 200 may include a screen bounding box 208, a smoothness 210, a tone response curve 212, a bit depth 214, a color space 216, and a screen base address 218. This control data may store physical parameters relating to a display, such as the screen base address 218 or the tone response curve 212. The tone response curve 212 may adjust the grayscale values of the encoded scan data, as described below, according to non-linearities for a display device. For example, an intensity value of 50% of full scale may result in a pixel intensity of 65% for a particular device. The tone response curve 212 may adjust for such non-linearities using a look-up table or some other algorithmic or look-up-based approach. Other control data may correspond to parameters specified by a user (or programmer). For example, the smoothness 210, which stores a value for a fineness or granularity of edge processing, may be a value (or values) describing an N×N matrix of sub-regions each display pixel, as will be described below.

The path 202 is provided to a scan converter 220, which, using data from an intersection 221, provides intersection data to an intersection buffer 222. An intersection process 224 further processes the intersection data, and provides an output to a scan line blender 226, which combines the output with other graphical object descriptors and control data to generate an output to a video memory or a physical display. Intermediate data generated by the shape processor 200 may include a path bounding box 228, a flattened path 230, and a clip mask 232. The clip mask 232 or flattened path 230 can be used independently of the shape processor 200 or may be re-presented as valid input, thereby reducing redundancy of repeated calls to the shape processor 200. Other intermediate data (not shown) may be generated by the shape processor 200 for output, including as examples, intersected inputs or other pre-processing adjustments such as decompression of fill maps, and color space conversions, corrections, adjustments, and scaling.

Prior to scan line processing, the scan converter 220 may preprocess the path 202. For example, unnecessary scan conversions may be avoided by intersecting certain data and determining whether processing is required. For example, the bounding box 203 for the path 202 and the screen bounding box 208 may be intersected in the intersection 221. If the output from the intersection 221 is null, then no further processing is required. Although not shown explicitly in FIG. 2, other intersections may be obtained, such as an intersection with a bounding box for the fill 204 (which may be inferred by the shape processor 200 from the fill data), or a bounding box for the alpha 206 (which may again be inferred by the shape processor 200 from the alpha data). If an intersection set is null, no processing is required for the path 202 and a next sequential path 202 may be processed immediately. As noted above, if a clip mask 232 is presented as a shape, instead of the path 202, the clip mask 232 may be passed directly to the scan line blender 226, thus bypassing scan conversion and other path processing steps. Any intermediate processing data may be stored in this manner to avoid or reduce redundant processing, including, for example, the clip mask 232, fill data, alpha data, flattened path data, and so forth.

The scan converter 220 may convert the path 202 into intersections with scan lines of a target display device. This function may be performed on an up-sampled basis, using the smoothness 210. That is, prior to locating intersections, each line of pixels may be divided into sub-pixel regions, or sub-pixel matrixes, using the smoothness 210 as a parameter. So, for example, a smoothness 210 of two may result in a scan line of one-hundred pixels being processed to generate intersection data as a two by two-hundred array of sub-pixel regions covering the same area of a screen display. A smoothness 210 of four may result in the same scan line being processed to generate intersection data as a four by four-hundred array of sub-pixel regions, and so forth.

The path 202 may then be applied to the sub-pixel regions. The resulting intersections, or intersection data, may be stored on a horizontal, line-by-line basis, including an x-coordinate for each intersection, along with a direction (e.g., up or down) in which the path intersects a horizontal axis. Other representations are known, and may also be used by the scan converter 220. The scan converter 220 may generate the path bounding box 228. The scan converter 230 may also generate a flattened path 230 as an intermediate step, in which continuous, non-linear segments, such as Bezier curves, are converted to a number of straight path segments. This may reduce the computational complexity of operations associated with the path. The intersection data may be stored in the intersection buffer 222.

In general, the intersection process 224 analyzes rows of sub-pixel regions and identifies runs of pixels that are outside a shape, pixels that are inside a shape, and transition pixels. The transition pixels, those that are on the edges of a shape and intersect the shape so that they are partially inside and partially outside the shape, may be smoothed to remove or reduce jaggedness or other artifacts associated with rendering. This over-sampling technique is described below in more detail with reference to FIG. 3. Inside pixels, outside pixels, and transition pixels, may then be blended into video memory as will be described below.

Figure 3:
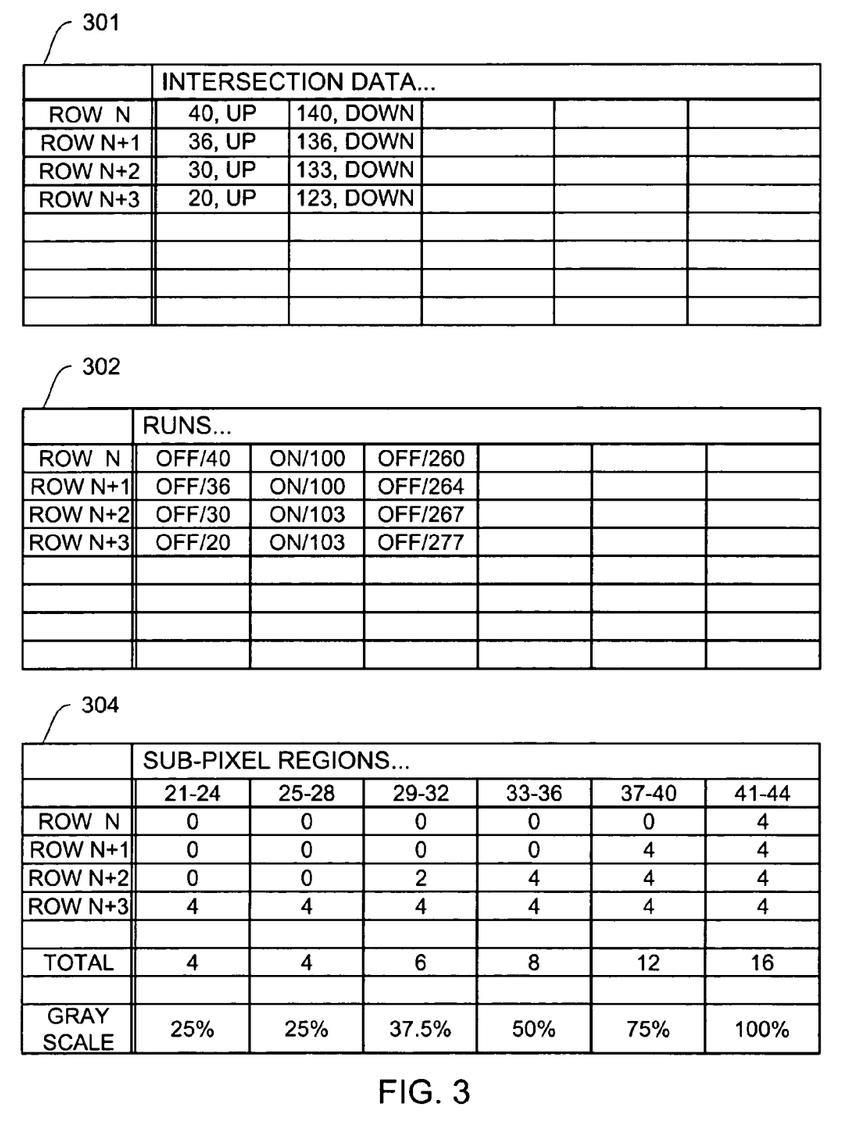
FIG. 3 depicts an example of an operation on intersection data performed by an intersection process.

FIG. 3 depicts an example of an operation on intersection data performed by the intersection process 224. In the example of FIG. 3, the intersection data corresponds to a scan line of one-hundred pixels, with a smoothness 210 having a value corresponding to a four-by-four sub-pixel matrix for each scan line pixel.

A chart 301 shows intersection data received from the intersection buffer 222 of FIG. 2. As shown in the chart 301, the intersection data may generally include x-coordinates where the path 202 intersects sub-pixel regions, coupled with a direction of the path 202. For the first row, Row N, the path 202 intersects the $40^{th}$ sub-pixel in an upward direction. On the same row, the path 202 intersects the $140^{th}$ sub-pixel in a downward direction. Intersection data is also set forth in the chart 301 for Rows N+1 through N+3. It will be appreciated that this is a specific example, and that more or less intersection data may be provided for a row of sub-pixel regions depending on the complexity of the path 202.

The intersection data may be processed to extract runs of 'on' or 'off' according to a winding rule or similar method. In the example shown in FIG. 3, the intersection data of the chart 301 may be processed in this manner to generate the encoded data of a chart 302 by application of an even/odd winding rule, in this example.

As depicted in the chart 302, data for each row of sub-pixels may be encoded as a data pair including an on/off flag and a run of adjacent sub-pixels in the row sharing the on/off flag. In general, the end of a run may identified by a transition from inside to outside, or vice versa, as determined by applying a winding rule or similar technique to the intersection data. From this data, runs of pixels may be extracted, reflecting pixels of the target display that will be completely inside or outside the shape that is described by the intersection data. In the example of the chart 302, a first run of five 'off' pixels that are outside the shape may be readily recognized, corresponding to Rows N through N+3, and horizontal sub-pixel regions 1–20.

As depicted in chart 304, the transition from 'off' runs to 'on' runs may be characterized by the number of 'on' or 'off' sub-pixel regions for each row of sub-pixels. In the present example, the data after the first run of five 'off' pixels may be grouped into collections of four sub-pixel regions corresponding to pixels, e.g., sub-pixel regions 21–24, 25–28, and so forth. The 'on' sub-pixel regions in each group of sub-pixel regions may then be summed over four rows to obtain a total number of 'on' sub-pixel regions for a pixel. The chart 304 shows this total for six horizontally consecutive pixels. The first of these pixels, corresponding to horizontal sub-pixel regions 21–24 and Rows N through N+3, includes no 'on' sub-pixel regions from Rows N through N+2, and four 'on' sub-pixel regions from Row N+3. This provides a total 'on'-ness for this pixel of four sub-pixel regions. This corresponds to a ratio of 4:16 or twenty-five percent ($4/16$ of the four-by-four sub-pixel matrix). This is represented as a twenty-five percent grayscale value for this pixel. This analysis may be repeated for horizontally consecutive sub-pixel regions until a fully 'on' pixel is reached. In the example of FIG. 3, an 'on' pixel is reached at sub-pixel region 41–44, where sixteen out of sixteen sub-pixel regions are 'on'. The corresponding pixel may begin a run of 'on' pixels to the end of a scan line, or until a next transition, should such a transition occur.

Figure 4:
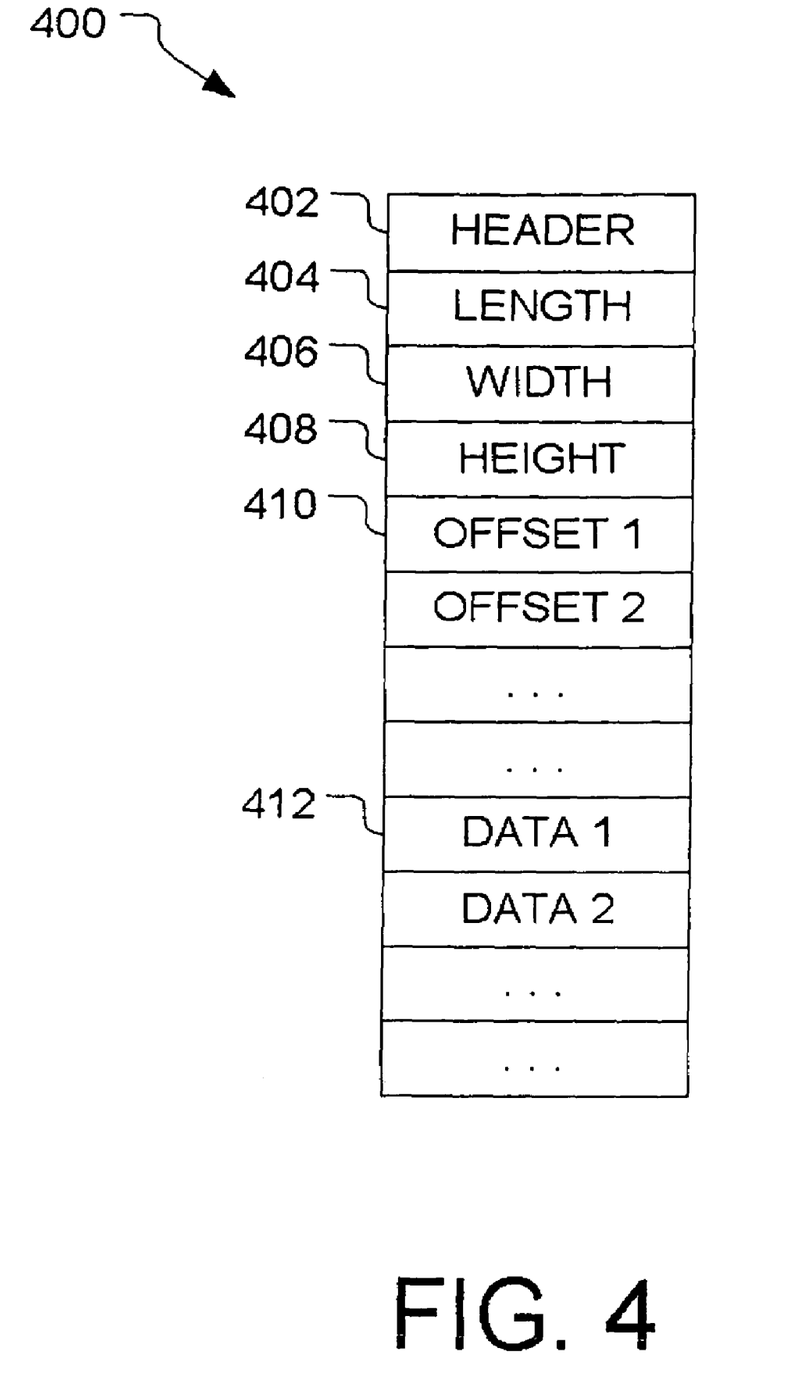
FIG. 4 shows a data structure for encoded scan data.

The resulting data for each scan line is represented as runs of 'on' pixels, runs of 'off' pixels, and one or more transition pixels that have grayscale values indicating how much of each transition pixel is inside (or alternatively, outside) a shape. FIG. 4, below, shows an example of a data structure containing scan lines of data run-length encoded in this form. In some implementations, grayscale values may include the maximum or minimum grayscale value (e.g., 100% or 0%), which otherwise represent pixels or runs that are 'on' or 'off'. This approach may be applied advantageously, for example, to optimize encoding of data that exhibits short runs that switch between 'on' and 'off'.

It will be appreciated that other techniques may be used to derive grayscale values for transition pixels. For example, the portion of a pixel that is inside a shape may be determined mathematically using point and slope information for the path 306. By smoothing shape edges into grayscale values, an achromatic anti-aliasing operation may be performed for a full color image. Color may be subsequently provided in a scan line blender, as will be described below. This technique may also be advantageously employed without over-sampling (i.e., with a smoothness 210 value specifying that each pixel corresponds to a single sub-pixel region), because it postpones processing of alpha and fill values for a shape until scan lines of new pixel data are blended with scan lines of current pixel data. It should also be appreciated that, although the above example relates to a shape having a single inside region, more complex shapes that include multiple inside and outside regions may be similarly characterized.

Referring again to FIG. 2, the output of the intersection process 224 may be stored as a clip mask 232. The clip mask 232 may be indexed according to a reference number based on, for example, the path pointer for the path 202 that has been processed, as well as any scaling information. When stored in this manner, each new path 202 received by the shape processor 200 may be compared to a pool of cached clip masks so that redundant processing of identical shapes, such as recurring fonts in lines of text, may be reduced or avoided.

The scan line blender 226 may blend the output from the intersection process 224, or the clip mask 232, with a frame of current video data. As will be appreciated from FIG. 2, this may include additional calculations, not noted below, to map pixel values to display parameters such as display memory addresses, color space, bit depth, and so forth. Pre-processing by the scan line blender 226 may include decompression of an alpha map or a fill map, color space conversion, color correction, color adjustment, and scaling.

The scan line blender 226 may output directly to a screen, to some other display device, or to a frame buffer for subsequent bitmap rendering. This may include a non-video memory or an output bitmap format buffer. The scan line blender 226 may typically operate on one line of video data, or row of pixels, at a time. In certain embodiments, a number of scan line blenders may be provided to operate on a number of scan lines in parallel. For each pixel, the scan line blender 226 may combine the fill 204 (e.g., a 24-bit color value), the alpha 206, and the intersection process 224 output (or clip mask, when available) corresponding to that pixel. In general, the fill 204 is multiplied by alpha (for transparency (0<=alpha<=1)) and by the intersection process 224 output (0 (=off)<=output<=1 (=on)). This represents the pixel value generated by the shape processor 200. In the scan line blender 226, this new value is combined with the old value for the pixel, which is de-weighted by a complementary factor. This blending operation may be expressed mathematically as:

$$P_i = \alpha e f + (1 - \alpha e) P_{i-1} \qquad [\text{Eq. 1}]$$

where $f$ = the fill value for a pixel (e.g., a 24-bit color value);

$P_i$ = the scan line blender output;

$P_{i-1}$ = previous pixel value (from buffer);

$\alpha$ = alpha value of the shape at the pixel;

$e$ = edge value for the pixel (intersection process output)

= 0, outside

= 1, inside

= grayscale value, % of edge within shape

The blended output may be stored in the video memory for display. It will be appreciated that Eq. 1 is representative, and that other equations may be used to combine old and new data on a pixel-by-pixel basis, provided the equation weights old and new data suitably to reflect, for example, the transparency and the edges of new data. This may be, for example, a two step process in which edge weighting is performed first, followed by transparency weighting. In addition, there are degenerate forms of Eq. 1 that may be employed in the scan line blender 226 to reduce processing complexity. For example, when there is a run of pixels inside the shape that is fully opaque (i.e., e=1 & alpha=1), then the output of the scan line blender 226 is simply the fill value for each pixel. In this case, fill values, f, for the corresponding pixels may be provided directly to the video memory without further processing.

FIG. 4 shows a data structure for encoded scan data as output by the intersection process 224. Generally, pixel values may be stored as 'on', 'off', or 'grayscale'. Pixels that are on correspond to pixels inside a shape, which will be rendered as color values provided by the fill 204 of FIG. 2. Pixels that are off correspond to pixels outside the shape, and will not affect the existing display or frame buffer. As noted above, additional parameters may be provided with an object, such as a background fill that provides fill values for 'off' pixels, or pixels outside the shape. As another example, a replacement fill may be provided, which is subtracted from a previous value in the frame buffer prior to blending. Grayscale values represent shape edges, and will be rendered as color values provided by the fill 204, and scaled according to the grayscale value. The encoding provides a scheme for representing lines of video data that allows a significant reduction in processing costs when processing the shape. For example, encoding as runs of 'on' and 'off' is inexpensive and grayscale calculations are less expensive on memory usage and processor time because they avoid the requirement of a full pixel array for image processing. Additionally, the run-length encoding provides a benefit when storing the video data as clip masks. However, it will be appreciated that other compression techniques may suitably be used with the systems described herein.

The run-length encoded data structure 400 may include a header 402, a length 404, a width 406, a height 408, one or more offsets 410, and one or more data segments 412. The header 402 may include any header information useful for identifying or using the data structure 400. The length 404 may indicate a length of the data structure 400. The width 406 may indicate a value representative of a width, in pixels, of a shape. The height 408 may indicate a value representative of a number of scan lines of a shape. The one or more offsets 410 indicate byte offsets to data segments for each scan line of a shape. The one or more data segments 412 each contain encoded data for a scan line of a shape. The data segments 412 may be represented as 'inside' followed by a run length, in pixels, 'outside' followed by a run length, in pixels, or 'edge', followed by a number of pixels in the edge and a grayscale value for each one of the number of pixels in the edge. Each edge value may be represented, for example, as one byte (256 levels) grayscale value.

Figure 5:
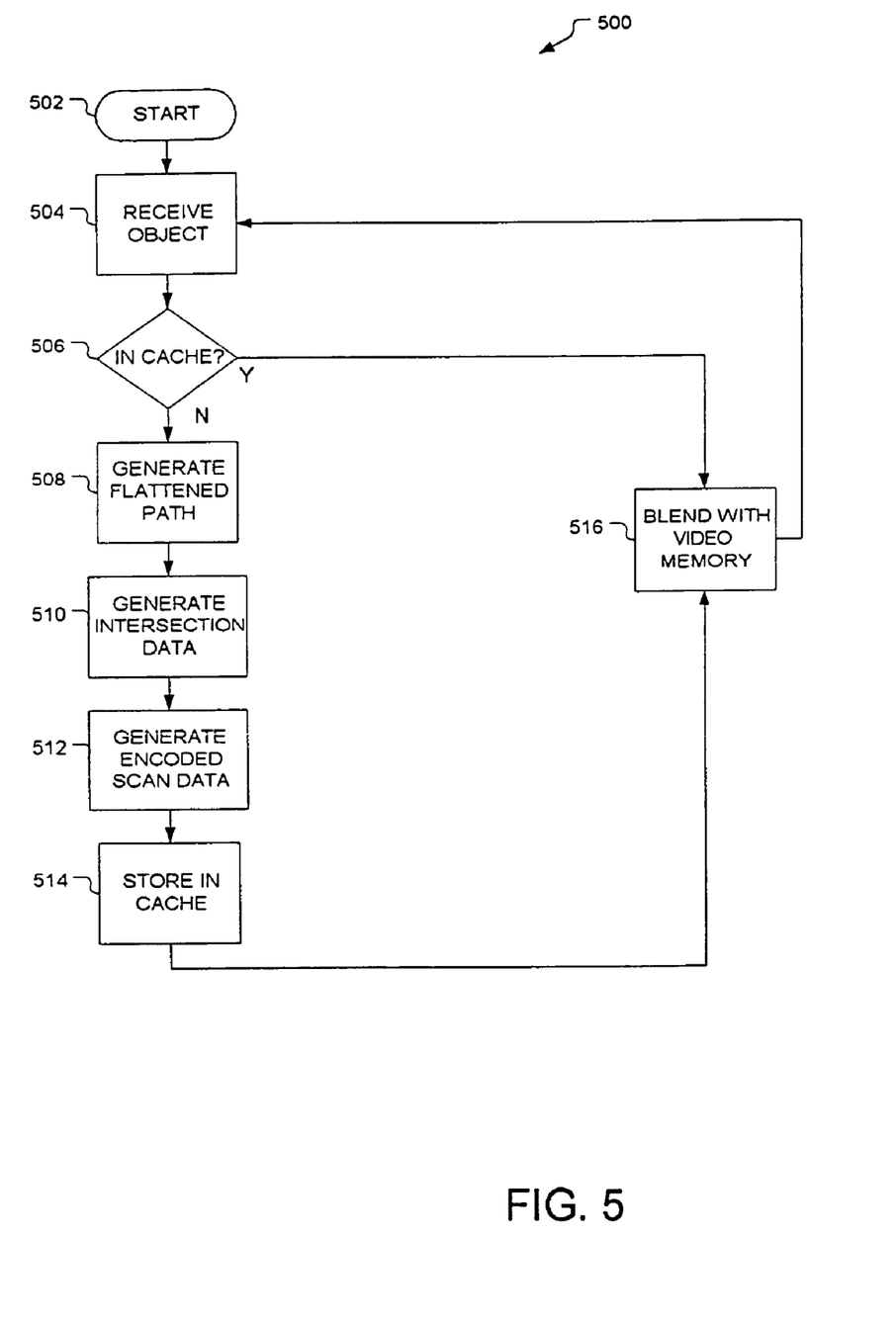
FIG. 5 is a flow chart of a process for shape processing.

FIG. 5 is a flow chart of a process for shape processing. In the following discussion, the phrase "intersection data" is intended to refer to data describing intersections between a path and sub-pixel regions. In a degenerate case, each sub-pixel region may correspond to a complete pixel, and no smoothing is thus performed. The phrase "encoded scan data" is intended to refer to data, in uncompressed or compressed (e.g., run-length encoded) form describing regions of a scan line in one of three states, namely on, off or grayscale. The runs are determined by a transition from inside to outside of a path as defined by applying a winding rule or similar technique to the intersection data.

The process 500 may start 502 by receiving an object, as shown in step 504. The object may be, for example, the graphical object 100 described above in reference to FIG. 1. In an optional step 506, it is determined whether the object is in a cache. This determination may be made using, for example, the shape name or any other information that can uniquely identify the shape of the object as corresponding to an item in the cache. If the shape of the object is cached, then the process 500 may proceed to step 516 where the object may be blended with current video memory using the cached shape and any fill and transparency data supplied with the object. If the shape is not cached, then the process 500 may proceed to step 508.

As seen in step 508, the process 500 may generate a flattened path, as described above in reference to the scan converter 220 of FIG. 2. The flattened path may then be used to generate intersection data representative of intersections between a path and sub-pixel regions, as shown in step 510. It may be understood that these intersections may be representative of the edges of a shape. As shown in step 512, encoded scan data may then be generated from the intersection data, as described above, for example, in reference to the intersection process 224 of FIG. 2. The encoded scan data, representative of an outline of the shape of the object, may be stored in the cache, as shown in step 514. The encoded scan data may then be blended with video memory, as shown in step 516, and as described in more detail in reference to the scan line blender 226 of FIG. 2. The process 500 may then return to step 504, where a next consecutive object may be received.

The video memory may provide frames of video data to a display where the contents of the video memory are converted to human-viewable form. The video memory may also store one or more frames of previous video data for blending with new lines of video data generated by the shape processor. It will be appreciated that the display may be a liquid crystal display, light-emitting diode display, or any other display for providing video data in human-viewable form. The display may also be a printer, plotter, or other device for reproducing video data in a fixed, tangible medium such as paper.

It will be appreciated that the above process 500, and the shape processor 200 of FIG. 2, may be realized in hardware, software, or some combination of these. The process 500 may be realized in one or more microprocessors, microcontrollers, embedded microcontrollers, programmable digital signal processors or other programmable device, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. The process 500 and the shape processor 200 may also, or instead, include an application specific integrated circuit, a programmable gate array, programmable array logic, or any other device that may be configured to process electronic signals.

Any combination of the above circuits and components, whether packaged discretely, as a chip, as a chipset, or as a die, may be suitably adapted to use with the systems described herein. It will further be appreciated that the above process 500 and shape processor 200 may be realized as computer executable code created using a structured programming language such as C, an object oriented programming language such as C++, or any other high-level or low-level programming language that may be compiled or interpreted to run on one of the above devices, as well as heterogeneous combinations of processors, processor architectures, or combinations of different hardware and software.

The shape processor 200 may be particularly suited to parallel and/or pipelined image processing systems where different graphical objects may be simultaneously processed, and then blended into a frame of video memory. The shape processor 200 may thus be realized as a number of physically separate processes, or as a number of logically separate processes such as multiple shape processor threads executing on a microprocessor. This approach may similarly be applied to different scan lines of a graphical object.

The above systems provide efficient image rendering for displays that may be well suited to small, low-power devices such as portable devices having Liquid Crystal Display ("LCD") screens, including electronic organizers, palm-top computers, hand-held gaming devices, web-enabled cellular phones (or other wireless telephones or communication devices), and Personal Digital Assistants ("PDAs"). The system may also be incorporated into low-cost terminal devices with display units, such as enhanced telephones, thin network clients, and set-top boxes, as well as other rendering devices such as printers, plotters, and the like. The system may be usefully employed as, for example, an embedded system in document handling devices such as facsimile machines, printers, photocopiers, and so forth, where a display of work documents and/or a user interface may enhance functionality. The system may be usefully employed in in-car systems that render images and/or provide a graphical user interface to an automobile user, such as in a dashboard or center console or an automobile. The systems described herein may be incorporated into consumer devices including an audio player, a microwave, a refrigerator, a washing machine, a clothing dryer, an oven, or a dishwasher. The systems described herein may also be usefully deployed in any of the above systems where output is generated to different devices, such as a display, a printer, a network, and/or a file. A single device may use the shape processor to output to any or all of these devices.

While the invention has been disclosed in connection with the preferred embodiments shown and described in detail, it will be understood that the invention is not to be limited to the embodiments disclosed herein, but is to be understood from the following claims, which are to be interpreted as broadly as allowed under the law.

What is claimed is:

1. A method of composing a video frame, comprising:
   providing a pixel array corresponding to the video frame, each pixel within the array having a pixel value;
   receiving a stream of objects, each object having a shape, a transparency, and a fill;
   processing each of the objects, one object at a time, to update the pixel array based at least on the shape, transparency, and fill of the object being processed and the current state of the pixel array, wherein updating the pixel array includes
      for each pixel in the pixel array, blending the fill corresponding to the object with the current value of the pixel by weighting the fill with a weighting factor and deweighting the current pixel value with a complimentary factor, wherein the weighting factor is the product of the transparency of the object and a pixel state factor, wherein the pixel state factor is set to about unity for pixels located within the object, to about zero for pixels located outside the object, and to about an edge value for transition pixels; and
   outputting the video frame to a display device.

2. The method of claim 1 wherein the transparency comprises one of a transparency value and a pointer to a bitmap of transparency values.

3. The method of claim 1 wherein the fill includes at least one of a color, a texture, and a bitmap.

4. The method of claim 1 wherein the fill includes a time-varying bitmap.

5. The method of claim 1 wherein the shape comprises a path including a plurality of segments.

6. The method of claim 1 wherein the shape of the received object is represented as a clip mask of encoded scan data.

7. The method of claim 6 wherein the updating of the pixel array includes accessing the clip mask and blending encoded scan data associated with the clip mask.

8. The method of claim 1 wherein the processing of each object further comprises converting the shape of the object into a data structure of encoded scan data, the data structure containing one data segment for each scan line of the pixel array.

9. The method of claim 8 wherein each data segment describes pixel state information.

10. The method of claim 9 wherein the pixel state information includes at least one of i) an inside state followed by a run length in pixels of pixels inside the shape, ii)an outside state followed by a run length in pixels of pixels outside the shape, or iii) an edge state followed by a number of pixels in the edge and an edge value for each of the pixels in the edge.

11. The method of claim 8 wherein the blending is done one scan-line at a time.

12. The method of claim 1 wherein the edge value corresponds to the proportion of the pixel that is inside the shape.

13. A system for composing a video frame comprising:
- a frame buffer for storing a pixel array corresponding to the video frame, each pixel within the array having a pixel value;
- a receiver for receiving a stream of objects, each object having a shapes transparency, and a fill; and
- a shape processor for processing each of the objects, one object at a time, to update the pixel array based at least on the shape, transparency, and fill of the object being processed and the current state of the pixel array, wherein updating the pixel array includes
  - for each pixel in the pixel array, blending the fill corresponding to the object with the current value of the pixel by weighting the fill with a weighting factor and deweighting the current pixel value with a complimentary factor, wherein the weighting factor is the product of the transparency of the object and a pixel state factor, wherein the pixel state factor is set to about unity for pixels located within the object, to about zero for pixels located outside the object, and to about an edge value for transition pixels.

14. The system of claim 13 wherein the transparency comprises a transparency value or a pointer to a bitmap of transparency values.

15. The system of claim 13 wherein the fill includes at least one of a color, a texture, or a bitmap.

16. The system of claim 13 wherein the fill includes a time-varying bitmap.

17. The system of claim 13 wherein the shape comprises a path including a plurality of segments.

18. The system of claim 13 wherein the shape of the received object is represented as a clip mask of encoded scan data.

19. The system of claim 18 wherein the shape processor updates the pixel array by accessing the clip mask and blending encoded scan data associated with the clip mask.

20. The system of claim 13 wherein the shape processor converts the shape of each object into a data structure of encoded scan data, the data structure containing one data segment for each scan line of the pixel array.

21. The system of claim 20 wherein each data segment describes pixel state information.

22. The system of claim 21 wherein the pixel state information includes at least one of i) an inside state followed by a run length in pixels of pixels inside the shape, ii)an outside state followed by a run length in pixels of pixels outside the shape, or iii) an edge state followed by a number of pixels in the edge and an edge value for each of the pixels in the edge.

23. The system of claim 20 wherein the blending is done one scan-line at a time.

24. The system of claim 13 wherein the edge value corresponds to the proportion of the pixel that is inside the shape.

* * * * *